United States Patent
Uehara

Patent Number: 5,805,139
Date of Patent: Sep. 8, 1998

[54] COMPUTER SYSTEM WITH STANDARD BUILT-IN POINTING DEVICE, WHICH IS CONNECTABLE TO OPTIONAL EXTERNAL POINTING DEVICE

[75] Inventor: Keiichi Uehara, Tokyo, Japan

[73] Assignee: Kabushiki Kaisha Toshiba, Kawasaki, Japan

[21] Appl. No.: 756,601

[22] Filed: Nov. 27, 1996

Related U.S. Application Data

[63] Continuation of Ser. No. 282,551, Jul. 29, 1994, abandoned.

[30] Foreign Application Priority Data

Jan. 31, 1994 [JP] Japan .................. 6-009779

[51] Int. Cl.$^6$ ...................................... G09G 5/00
[52] U.S. Cl. .................. 345/156; 345/161; 345/163
[58] Field of Search ...................... 345/156, 157, 345/161, 163; 395/836; 273/148 B

[56] References Cited

U.S. PATENT DOCUMENTS

| | | | |
|---|---|---|---|
| 4,550,316 | 10/1985 | Whetstone et al. | 345/163 |
| 5,317,695 | 5/1994 | Celi, Jr. | 395/836 |
| 5,404,524 | 4/1995 | Celi, Jr. | 395/700 |
| 5,407,285 | 4/1995 | Franz | 400/490 |
| 5,442,376 | 8/1995 | Tannenbaum et al. | 345/156 |
| 5,467,108 | 11/1995 | Mimlitch | 345/161 |
| 5,488,384 | 1/1996 | Uehara et al. | 345/1 |

FOREIGN PATENT DOCUMENTS 5-127862  5/1993  Japan .

OTHER PUBLICATIONS

*Toshiba T3400 Series Portable Personal Computer User's Manual, Second Edition, Dec. 1993.*

*Primary Examiner*—Kee M. Tung
*Assistant Examiner*—Matthew Luu
*Attorney, Agent, or Firm*—Finnegan, Henderson, Farabow, Garrett & Dunner, L.L.P.

[57] ABSTRACT

In a computer system having a built-in pointing device, connection/disconnection of an external pointing device having a processor is detected upon activation of the computer system. A battery-backed-up memory in the computer system stores information representing a use mode of pointing devices. If the use mode is set in an "auto-selected mode" and the connection of the external pointing device is detected, the use of the internal pointing device is disabled and only the external pointing device can be used under the control by the processor included in the external pointing device. If the use mode is set in a "simultaneous mode", both the internal and external pointing devices can be used.

8 Claims, 7 Drawing Sheets

```
                    SET-UP MENU
        MEMORY                      HARD DISK
  ┌─────────────────────────┐  ┌─────────────────────────┐
  │ TOTAL         = 4096KB  │  │ CAPACITY  =   ***MB     │
  │ BASE          =  640KB  │  └─────────────────────────┘
  │ EXTENDED      = 3328KB  │          PASSWORD
  │ SHADOW BIOS ROM = 128KB │  ┌─────────────────────────┐
  └─────────────────────────┘  │      NOT REGISTERED     │
                               └─────────────────────────┘

DISPLAY                        OTHERS
  ┌─────────────────────────┐  ┌─────────────────────────────┐
  │ DISPLAY ADAPTOR = VGA   │  │ POWER-UP MODE   = BOOT      │
  │ LCD DISPLAY MODE = COLOR│  │ CPU CACHE       = ENABLED   │
  │ LCD DISPLAY             │  │ PROCESSING SPEED = HIGH     │
  │ COLORS       = 180K COLORS│ BATTERY SAVE    _ FULL       │
  │ POWER ON     = INTERNAL/│  │ MODE            ‾ POWER     │
  │ DISPLAY        EXTERNAL │  │ SPEAKER VOLUME  = HIGH      │
  └─────────────────────────┘  │                             │
                               │ ALARM POWER ON  = DISABLED  │
    COM/PCMCIA/FDD/PRT         │ BOOT PRIORITY   = FDD→HDD   │
  ┌─────────────────────────┐  │                   AUTO-     │
  │ SERIAL PORT  = COM1     │  │ POINTING DEVICES = SELECTED │
  │                (IRO4/3F8H)│ HOTKEY          = ENABLED   │
  │ PC CARD SLOT = PCMCIA   │  │ Ext. KEYBOARD "Fn"          │
  │ Ext. 5 1/4 FDD/PRT = PRINTER│ KEY EQUIVALENT  = DISABLED │
  │ PRINTER PORT = OUTPUT   │  └─────────────────────────────┘
  │ TYPE                    │
  └─────────────────────────┘
```

COMPUTER SYSTEM WITH STANDARD BUILT-IN POINTING DEVICE, WHICH IS CONNECTABLE TO OPTIONAL EXTERNAL POINTING DEVICE

This is a continuation of application Ser. No. 08/282,551, filed Jul. 29, 1994, now abandoned.

BACKGROUND OF THE INVENTION

1. Field of the Invention

The present invention relates generally to a computer system having a pointing device such as a pointing stick as a standard built-in component, and more particularly to a computer system to which an external pointing device such as an intelligent mouse having a built-in processor can be connected.

2. Description of the Related Art

In a certain type of conventional personal computer system, a pointing device is used to input movement direction data and movement distance data in accordance with operations by a user. Such a pointing device is used, for example, to designate a desired point on the screen of a display.

In particular, with recent development of a GUI (Graphical User Interface), the pointing device is used to designate a picture or an icon displayed on the screen. Thus, there is a growing tendency for portable computers, etc. to have pointing devices as standard built-in components. Such personal computers with built-in pointing devices include a personal computer having a small-sized, simple pointing stick as a standard built-in component, which is provided at a specified location on the keyboard for fingertip operation.

With a personal computer having such a pointing stick, a desired data input operation on two-dimensional coordinates can be easily performed on the keyboard thereby enhancing the operability. For example, commands, which must be learned by the user may be displayed on the screen in the form of easily understandable icons or pictures and the commands can be executed by using the pointing stick to designate the icons or pictures. Accordingly, a user-friendly, intuitive operational environment can be provided for the personal computer user.

Typically, this type of pointing stick can has facilitated computer input operation for rough positional coordinates, but has failed to meet a need fine positional designation. Specifically, the input operation for exact positional coordinates, which can be performed by a conventional high-precision mouse, cannot be done by the pointing stick, and a smooth coordinate input operation, which meets the need for fine positional designation, cannot be performed.

To solve this problem, an improved personal computer has been developed, which has a pointing stick at a desired position on the keyboard as a standard built-in component, and to which a high-precision mouse with a built-in microprocessor can be optionally connected. In this pointing stick/mouse type of personal computers, however, the functions and performance of the optionally connected high-precision mouse are limited to conform to those of the built-in pointing stick. For example, there is an externally connectable high-precision mouse of a three-button type with three click buttons. By contrast, a general built-in pointing device such as a pointing stick is designed on the basis of a two-button type mouse with two click buttons. Thus, even if the three-button type high precision mouse is connected, the three-button type functions are not necessarily performed. Consequently, the functions and performance of the optionally connected high precision mouse cannot be fully realized. Moreover, since the types of usable mice connectable to the prior art pointing stick/mouse computers is limited, connection of a mouse of a certain type may not be recognized by a personal computer even if it is connected to the port of the personal computer.

As has been described above, in the computer system having the standard built-in type pointing device, to which the external pointing device can be connected, the functions and performance of the optionally connected external pointing device are limited to conform to those of the built-in pointing device. Furthermore, the type of usable external pointing devices is limited, and connection of an optionally connected external device of a certain type may not be recognized by a computer system.

SUMMARY OF THE INVENTION

An object of the present invention is to provide a computer system having a standard built-in pointing device, to which an external high precision pointing device can be connected, wherein the functions and performance of the optionally connected pointing device can be fully realized, thereby obtaining a coordinate input system with high operability.

Another object of the invention is to provide a computer system having a standard built-in pointing device, to which an external high precision pointing device can be connected, wherein a mode for use with the functions and performance of the external pointing device and a mode for use of both the built-in pointing device and external pointing device under the same control can be selected, thereby fully realizing the functions and performance of each pointing device and realizing a coordinate input system with high operability.

According to a first aspect of the present invention, there is provided a computer system having a built-in internal pointing device, which system is connectable to an optional external pointing device, the system comprising:

holding means for holding data on a use mode of the pointing devices;

detecting means for detecting connection/disconnection of the external pointing device to a computer system body in response to activation of the computer system; and control means for enabling use of both the internal pointing device and the external pointing device if the detecting means detects the connection of the external pointing device and the data on the use mode held in the holding means indicates use of both the internal pointing device and the external pointing device, and enabling use of only the external pointing device if the detecting means detects the connection of the external pointing device and the data on the use mode held in the holding means indicates use of one of the internal pointing device and the external pointing device.

According to a second aspect, there is provided a computer system comprising:

an internal pointing device provided in the computer system as a standard built-in component;

a detachable external pointing device having a first processor for generating process data on the basis of a detected operation amount;

a second processor for generating process data on the basis of an operation amount detected by the internal pointing device;

a CPU (Central Processing Unit);

a selector, connected to the CPU, the external bonding device and the second processor, for closing one of a data transmission path between the CPU and the external pointing device and a data transmission path between the CPU and the second processor in accordance with switching information; and a register for storing the switching information, wherein the CPU detects connection/disconnection of the external pointing device upon power-on of the computer system, and if the connection of the external pointing device is detected, the selector writes in the register first switching information for closing the data transmission path between the CPU and the external pointing device, and if the disconnection of the external pointing device is detected, the selector writes in the register second switching information for closing the data transmission path between the CPU and the second processor.

According to a third aspect of the invention, there is provided a pointing device control method in a computer system having an internal pointing device, a processor for processing data from pointing devices and storing means for storing use mode data on use modes of the pointing devices, an external pointing device being connectable to the computer system, the method comprising the steps of:

a) setting the use mode data of the pointing devices in the storing means;

b) detecting connection/disconnection of the external pointing device to a computer system body upon activation of the computer system;

c) making data generated by the internal pointing device and the external pointing device effective under processing by the processor, if the use mode data set in the storing means indicates use of both the internal pointing device and the external pointing device and the connection of the external pointing device is detected in the step (b); and d) making data generated by the external pointing device effective, if the use mode data set in the storing means indicates use of one of the internal pointing device and the external pointing device and the connection of the external pointing device is detected in the step (b);

According to a fourth aspect of the invention, there is provided a pointing device control method in a computer system having an internal pointing device and a processor for controlling the internal pointing device, an external pointing device being connectable to the computer system, the method comprising the steps of:

a) detecting connection/disconnection of the external pointing device to a computer system body upon activation of the computer system;

b) making data input by the external pointing device effective if the connection of the external pointing device is detected in the step (a); and c) making data input by the internal pointing device effective under the control by the processor, if the disconnection of the external pointing device is detected in the step (a).

With the above structure or method of the invention, when the high precision external pointing device with the built-in microprocessor is optionally connected, the functions and performance of the external pointing device can be fully realized without being limited by the built-in pointing stick.

There is provided a computer system which can be operated in one of a "auto-selected" mode and a "simultaneous" mode. In the "auto-selected" mode, when the external pointing device is connected, the use of the built-in pointing device is prohibited, and the external pointing device can be used with its own functions and performance, and when the external pointing device is not connected, the built-in pointing device is used. In the "simultaneous" mode, both the built-in pointing device and external pointing device can be used. Thereby, a flexible coordinate input system, which meets the user's request, can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 7A to FIG. 7C are timing charts related to the operation illustrated in FIG. 6, in which

DETAILED DESCRIPTION OF THE PREFERRED EMBODIMENT

An embodiment of the present invention will now be described with reference to the accompanying drawings.

Figure 1:
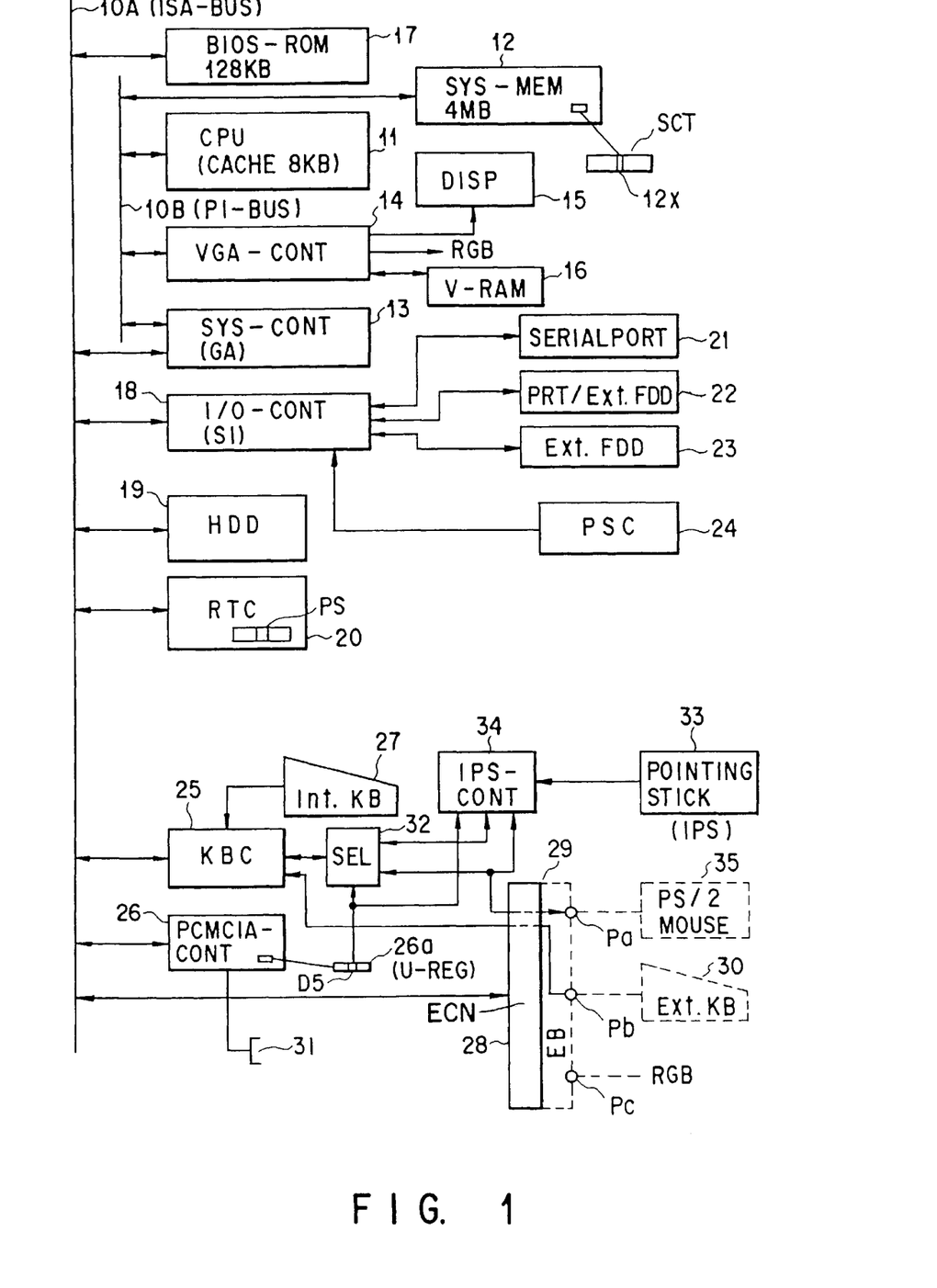
FIG. 1 is a block diagram showing a computer system according to an embodiment of the present invention.

FIG. 1 shows the structure of a computer system according to the preferred embodiment of the invention. The computer system shown in FIG. 1 is a laptop portable computer system. A system bus 10A transmits various data and addresses in the computer system. The system bus 10A is designed according to ISA (Industry Standard Architecture) specifications. The system bus 10A is connected to various input/output (I/O) devices such as a BIOS (Basic Input/Output System)-ROM (Read Only Memory) 17 and a system controller (SYS-CONT (GA)) 13, which will be described later. The system bus 10A is connected to a peripheral interface bus (PI-BUS) 10B via the system controller 13.

The peripheral interface bus 10B is connected to a CPU (Central Processing Unit) 11, a system memory (SYS-MEM) 12, the system controller 13, and a display controller (VGA-CONT) 14. The peripheral interface bus 10B transmits various data and addresses among these elements.

Figure 6:
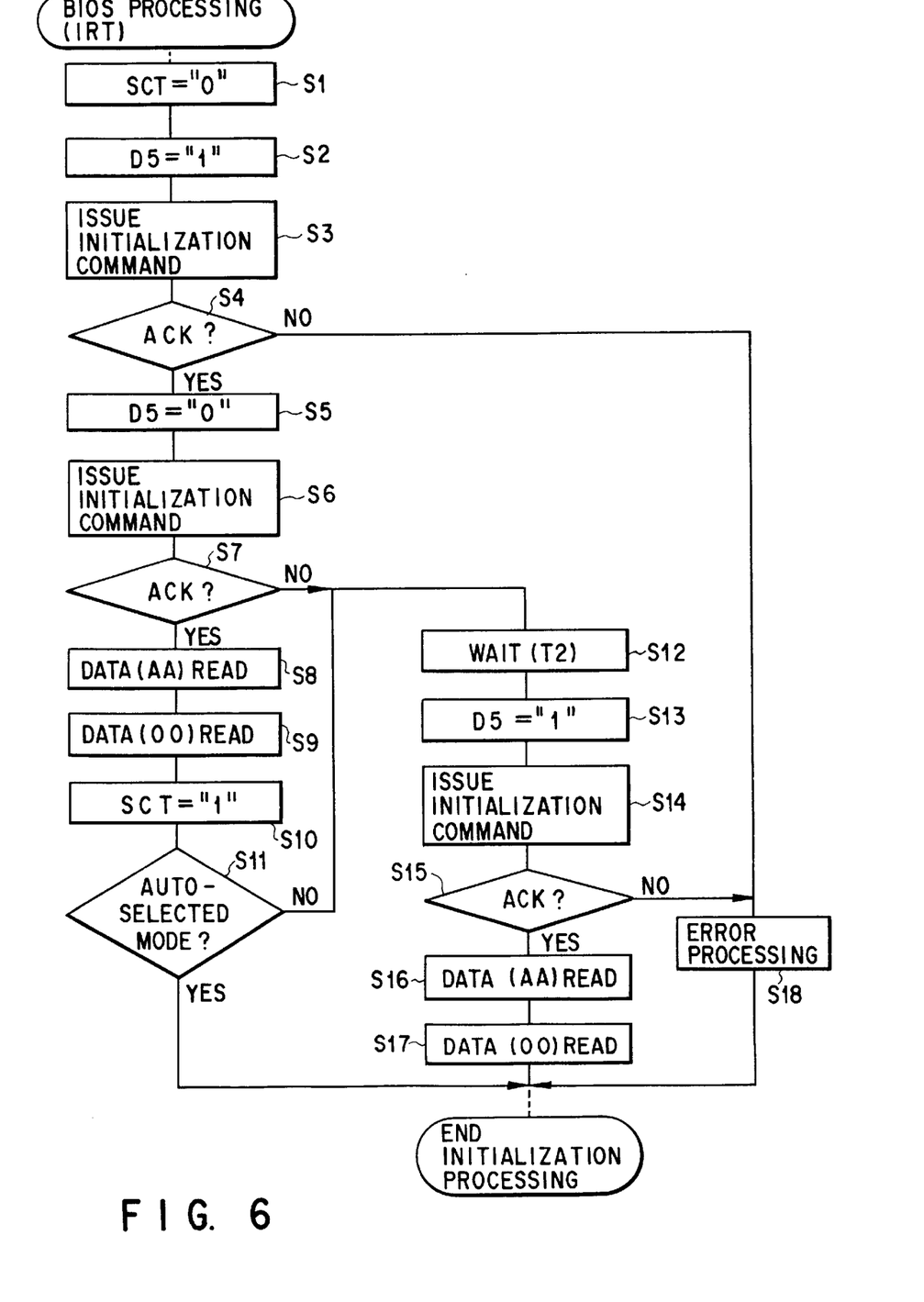
FIG. 6 is a flow chart illustrating a BIOS processing routine executed by an initialization process (IRT process) in this embodiment.

The CPU 11 controls the entire computer system shown in FIG. 1. The CPU 11 executes processes according to various programs stored in the system memory 12 and BIOS-ROM 17. For example, in the initializing process [or IRT (Initialize and Reliability Test) process or] executed upon turning on of a power (not shown) of the system, the CPU 11 executes a BIOS processing routine shown in FIG. 5, which will be described later herein. The CPU chip may be a U.S. Intel microprocessor 80486SX having a built-in 8KB cache memory or another type of microprocessor having the same functions.

The system memory 12 stores various programs to be executed by the CPU 11 or data to be processed. The entire memory area of the system memory 12 is 4MB, 128KB of which is used as a BIOS-ROM area. A system configuration table (SCT) showing a system device construction of the computer system is provided in a predetermined area of the system memory 12. This table includes a bit (mouse presence/absence bit) 12x indicating whether an external mouse (PS/2 Mouse) is connected to the computer system. A default value "0" indicating the state in which the external mouse is not connected is set as the mouse presence/absence bit 12x of the system configuration table (SCT) at the time of executing the initialization process.

The system controller (SYS-CONT(GA)) 13 comprises a gate array. The system controller 13 has logic for executing various controls such as a memory control, a bus control, an address latch control and an I/O register control.

Figure 5:
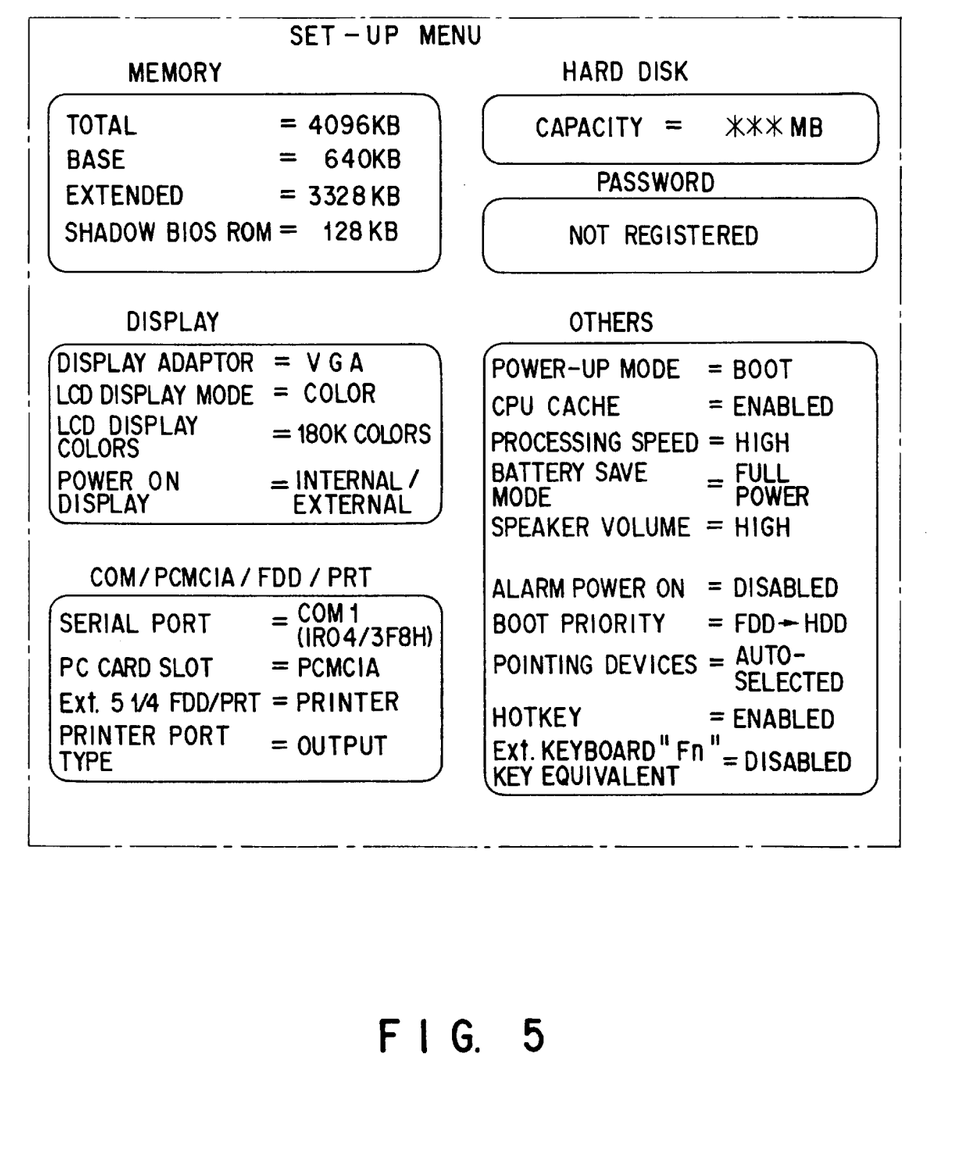
FIG. 5 shows an example of a set-up menu in this embodiment.

The display controller (VGA-CONT) 14 is connected to the peripheral interface bus 10B and also to a standard built-in internal display (DISP) 15 constituted by an LCD (Liquid Crystal Display), and an image memory (V-RAM) 16. The display controller 14 is designed according to VGA (Video Graphics Array) specifications. The display controller 14 receives image data from the CPU 11 through the peripheral interface bus 10B and stores the image data in the image memory 16. The display controller 14 controls driving of the display 15. Thereby, the image data stored in the image memory 16 is displayed on the display 15. The display controller 14 may be optionally connected to a color CRT (Cathode Ray Tube) monitor to control the color CRT monitor. As is shown in FIG. 5 which will be described later herein, the display 15 displays a set-up screen for setting a system configuration including selection items such as use modes of a pointing device.

The system bus 10A is connected to the BIOS-ROM 17, an I/O controller 18, a hard disk drive 19, and a real time clock 20 as well as to the system controller 13.

The BIOS-ROM (control memory) 17 stores a BIOS (Basic Input/Output System) or a system program for controlling I/O devices. In this embodiment, the BIOS-ROM 17 comprises a programmable flash memory. The BIOS stored in the BIOS-ROM 17 includes a program for executing an initialization process at the time of power-on, and the BIOS is copied into the system memory 12 at the time of executing the initialization process. After the initialization process has been executed, the CPU 11 accesses, if necessary, the BIOS copied in the system memory 12.

The I/O controller (I/O-CONT(SI)) 18 is a Super Integration IC(SI) which achieves a support function for a memory, etc. The I/O controller 18 contains two DMA (Direct Memory Access) controllers for a direct memory access control, two Programmable Interrupt Controllers (PIC), one Programmable Interval Timer (PIT), two Serial I/O Controllers (SIO), one floppy disk controller (FDC), and a Variable Frequency Oscillator. The I/O controller 18 is connected to a Serial Port 21, a printer/extension floppy disk drive (Prt/Ext.FDD) 22, an external floppy disk drive (FDD) 23, and a Power Supply Controller (PSC) 24 for controlling a power supply (not shown) for supplying an operation voltage to the system.

The hard disk drive (HDD) 19 is provided in the computer system body as a standard built-in component, and it has an IDE (Integrated Drive Electronics) interface. Thereby, the hard disk drive 19 is directly accessed by the CPU 11. The hard disk drive 19 has various programs including an external mouse driver. These programs are loaded in the system memory 12 when the system is set up.

The real time clock (RTC) 20 is a clock module having its operation powered by its own battery cell. The real time clock 20 includes a CMOS-structured static RAM (CMOS memory) which is constantly supplied with power from the cell. The static RAM stores set-up information representing a system configuration, etc. The set-up information includes set-up information of various systems and pointing device setting information (PS) indicating one of a "simultaneous" mode and a "auto-selected" mode.

In the "simultaneous" mode, both built-in pointing stick 33 (AccuPoint, see T3400 Series USER'S MANUAL submitted as IDS) and external mouse (PS/2 Mouse) 35 can be used. In the "auto-selected" mode, when the external mouse 35 is connected to the computer body, the use of the built-in pointing stick 33 is prohibited, and the external mouse 35 alone can be used, and, when the external mouse 35 is not connected, the built-in pointing stick 33 can be used.

The system bus 10A is further connected to a keyboard controller (KBC) 25 and a PCMCIA controller (PCMCIA-CONT) 26.

The keyboard controller (KBC) 25 is connected to a standard internal keyboard (Int.KB). An external keyboard (Ext.KB) 30 can be connected to the keyboard controller (KBC) 25 through an extension connector 28 and a port replicator 29.

The keyboard controller 25 generates a code corresponding to a depressed key of the internal keyboard 27 or external keyboard 30 and sends this code or a predetermined interrupt signal to the system bus 10A. The keyboard controller 25 receives various control commands and performs processing according to these commands. A built-in pointing stick (described later herein) is provided between predetermined key pads on the internal keyboard 27.

The PCMCIA controller 26 has a card slot 31 capable of supporting all memory cards designed according to standards of PCMCIA (Personal Computer Memory Card International Association). The PCMCIA controller 26 includes a universal register (U-reg) 26a of a register group indicating various states of the system.

The universal register 26a stores, e.g. a bit representing the connection/disconnection state of the port replicator 29, and a pointing device switching control bit for controlling switching of the pointing device. The pointing device switching control bit (bit D5(PORT5)) is used for chip selection of a pointing device selector 32 and an IPS controller 34 (described later).

For this reason, signal lines are provided such that information according to the pointing device switching control bit (D5(PORT5)), i.e., a switching control signal (CS) is directly sent to the pointing device selector and IPS controller, and not through the system bus 10A. When the pointing device switching control bit is "0", an "auto-selected mode" input mechanism is realized wherein, if the external mouse 35 is connected, only the external mouse 35 can be used, and if the external mouse 35 is not connected, the built-in pointing stick 33 can be used. When the pointing device switching control bit is "1", a "simultaneous mode" input mechanism is realized wherein both the built-in pointing stick and external mouse can be used.

The keyboard controller 25 is connected through the pointing device selector 32 to the IPS controller or exclusive-use processor (IPS-Cont) 34 for controlling the built-in pointing stick 33. Thereby, the keyboard controller 25 can transmit various commands and data with the IPS controller 34 through the pointing device selector 32.

The pointing device selector 32 allows connection of the external mouse (PS/2 Mouse) 35 via the extension connector 28 and port replicator 29. The external mouse 35 is connected so as to be able to send detected coordinate data to the pointing device selector 32 and also to send data to the IPS controller 34 through the port replicator 29 and the extension connector 28. Thus, the keyboard controller 25 can transmit various commands and data with the external mouse 35 through the pointing device selector 32.

Figure 9:
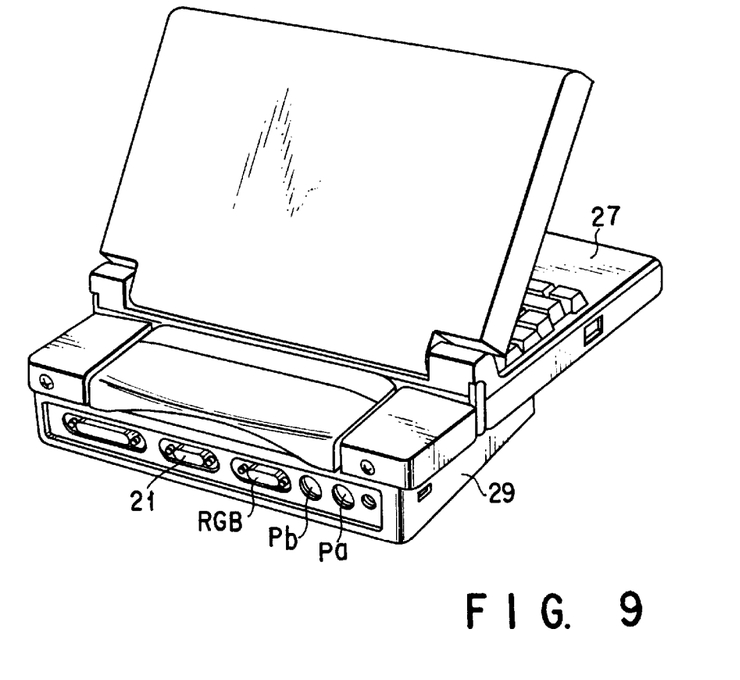
FIG. 9 is a perspective view showing the computer body with a port replicator which is mounted on an extension connector in this embodiment.

The extension connector 28 enables an extension unit to be connected to the computer system body. In this embodiment, an extension unit 29 called a "port replicator" can be connected. The port replicator 29 has a port Pa, to which the external mouse 35 can be connected, a port Pb, to which the extension keyboard 30 can be connected, and a port Pc to which a color monitor (RGB). The external mouse 35, connectable to the port Pa, is a high-performance intelligent mouse including a processor. FIG. 9 shows the disposition of the port replicator 29 when it is attached to the extension connector 28 (not visible in FIG. 9; see FIG. 1).

The pointing device selector (SEL) 32 has a data transmission path for transmission of data between the IPS controller 34 and keyboard controller 25, and a data transmission path for transmission of data between the external mouse 35 and keyboard controller 25. These two transmission paths are switched according to the aforementioned pointing device switching control bit stored in the universal register 26a built in the PCMCIA controller 26.

When the pointing device switching control bit is "0", the pointing device selector 32 cuts off the transmission path between the IPS controller 34 and keyboard controller 25 to disable data transmission between the IPS controller 34 and keyboard controller 25. Thereby, only data transmission between the external mouse 35 and keyboard controller 25 is permitted.

On the other hand, if the pointing device switching control bit is "1", the pointing device selector 32 cuts off the transmission path between the external mouse 35 and keyboard controller 25 to disable data transmission between the external mouse 35 and keyboard controller 25 through the pointing device selector 32 alone. Thereby, only data transmission between the IPS controller 34 and keyboard controller 25 is permitted.

Figure 10:
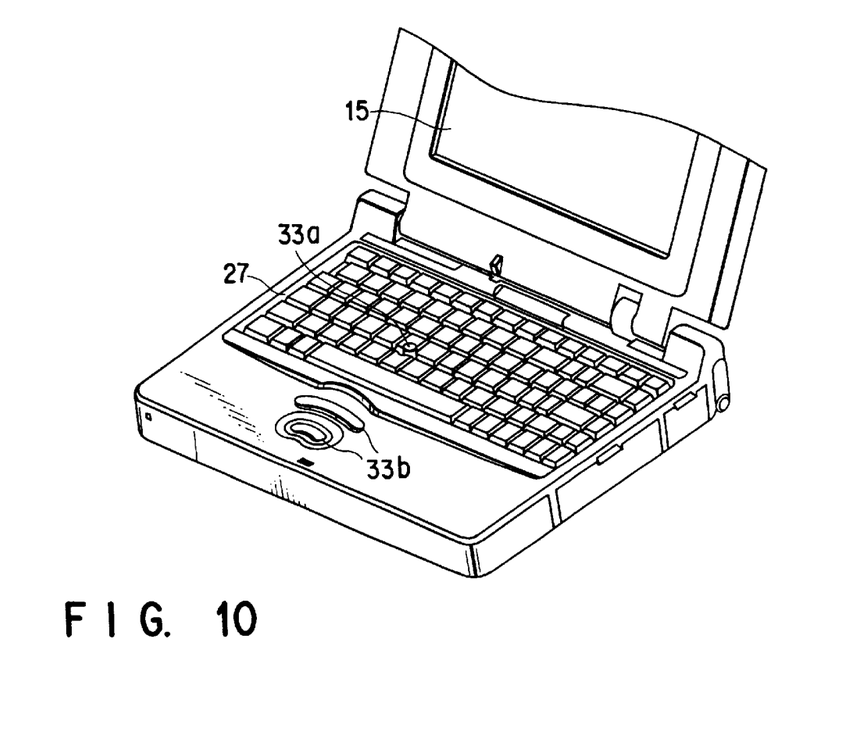
FIG. 10 is a perspective view showing an example of arrangement of a built-in pointing stick on a keyboard of the computer body of this embodiment.

The internal pointing stick (IPS) 33 has an operating stick 33a. As shown in FIG. 10, the operating stick 33a is provided between home position keys ("F" key and "J" key in this embodiment) on the keyboard body. The operator can perform an all-directional two-dimensional coordinate input operation by moving the operating stick 33a with fingertip operation. As shown in FIG. 10, the operator-side portion of the keyboard is provided with two control buttons 33b for determining decision, release, etc. of positional coordinates (cursor position) indicated in accordance with the operating amount of the operating stick 33a. The amount of operation of the pointing stick 33a is sent from the internal pointing stick 33 to the IPS controller 34.

The IPS controller 34 controls an operation input of the internal pointing stick 33. Specifically, the IPS controller 34 executes a coordinate data input process in accordance with the operation of the operating stick 33a and sends the processed positional coordinates to the CPU 11 through the pointing device selector 32 and keyboard controller 25.

The IPS controller 34 includes, in addition to the port for receiving data from the internal pointing stick 33, a port for data transmission with the external mouse 35. Thereby, the IPS controller 34 can also control the data sent from the external mouse 35 connected via the extension connector 28 and port replicator 29. Furthermore, the IPS controller 34 provides a preferential processing function by which, when both the internal pointing stick 33 and external mouse 35 are used, i.e., in the "simultaneous mode", input data of the first operated pointing device is preferentially processed.

Figure 2:
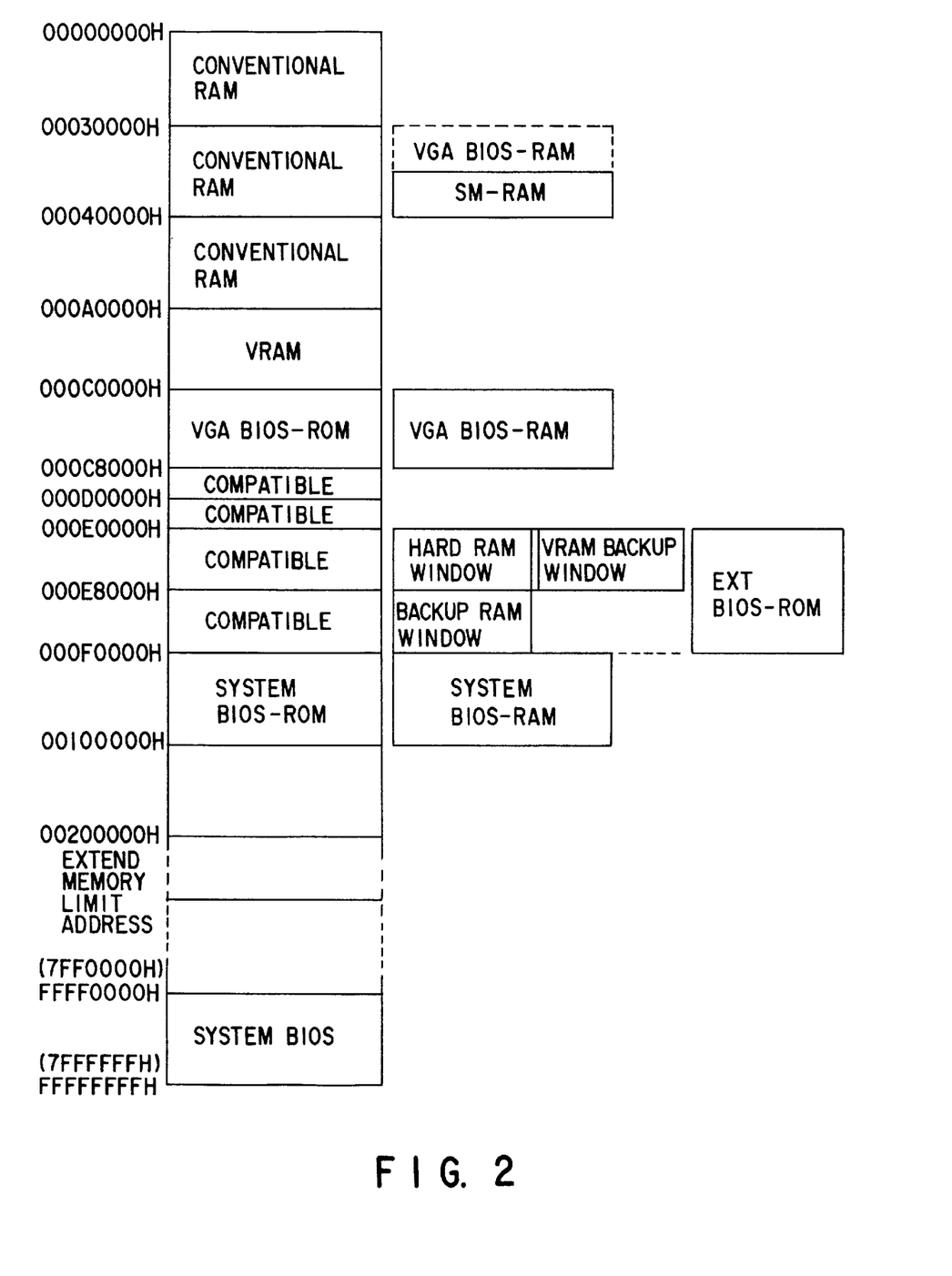
FIG. 2 is a memory map showing the structure of a memory of the computer system shown in FIG. 1.

FIG. 2 shows a memory map of the computer system according to the present embodiment. As described above, the driver for the external mouse 35, which is stored in the hard disk drive 19, is copied in the system memory 12 during the initializing process. In this case, the driver is stored in any of the areas of conventional RAMs shown in FIG. 2.

A specific example of the pointing device selector 32 and connection between the selector 32 and peripheral elements will now be described with reference to FIG. 3.

The pointing device selector 32 has two data transfer gates 32a and 32b. The data transfer gate 32a connects/disconnects a transmission path between an input/output (I/O) port D1 of the IPS controller 34 and the keyboard controller 25 according to a switching control signal CS. The data transfer gate 32b connects/disconnects a transfer path between the external mouse 35 and keyboard controller 25 according to the switching control signal CS.

The pointing device selector 32 is provided with an inverter 32c. The inverter 32c inverts the switching control signal CS input to the pointing device selector 32 and sends the inverted signal to the data transfer gate 32b. Accordingly, the switching control signal CS sent to the pointing device selector 32 is input to the data transfer gate 32a as it is, while the inverted signal of the switching control signal CS, which is obtained by the inverter 32c, is input to the data transfer gate 32b.

If the switching control signal CS, which is input to one of the data transfer gates 32a and 32b, is "1", the switching control signal CS to be input to the other is "0". Accordingly, while one of the data transfer gates is opened, the other is closed. When the switching control signal is "1", the data transfer path of each of the data transfer gates 32a and 32b is closed; and when the switching control signal is "0", the data transfer path thereof is opened.

Figure 3:
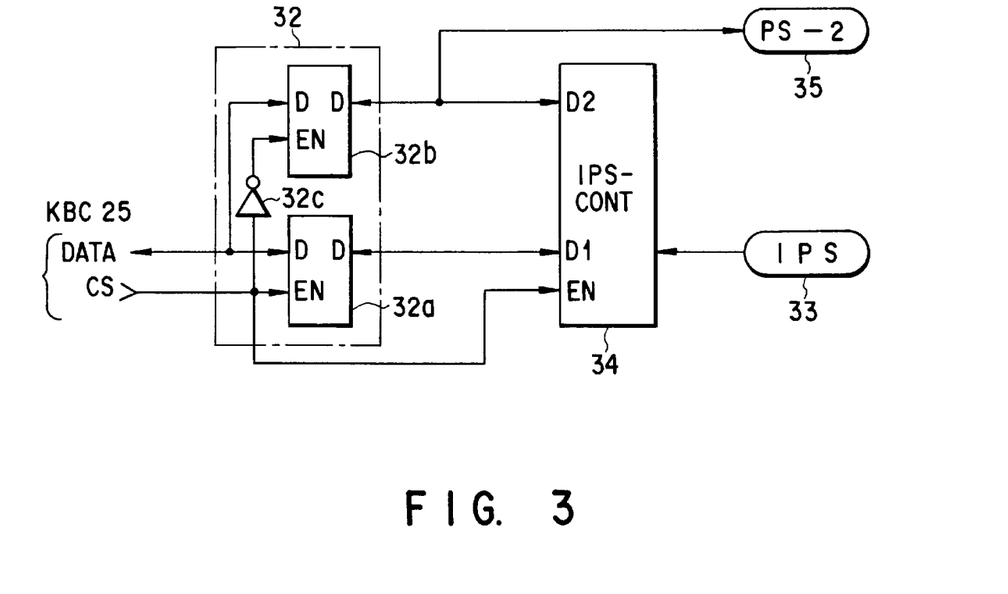
FIG. 3 shows the structure of a pointing device selector shown in FIG. 1 and connection between the pointing device selector and peripheral structural elements.

As shown in FIG. 3, the IPS controller 34 has two I/O ports D1 and D2, in addition to a connection port with the internal pointing stick 33. The I/O port D1 is connected to the data transfer gate 32a of the pointing device selector 32, and the I/O port D2 is connected to the data transfer gate 32b. The IPS controller 34 is supplied with the same switching control signal CS as the switching control signal CS input to the pointing device selector 32.

Thus, when then switching control signal CS having value "1" is supplied to the data transfer gate 32a, it is also supplied to the IPS controller 34. On the other hand, when the switching control signal CS having value "0" is supplied to the data transfer gate 32a, it is also supplied to the IPS controller 34.

The IPS controller 34 provides the preferential function noted above. When the switching control signal CS supplied to the IPS controller 34 is "1" and the external mouse 35 is connected to the system, the data corresponding to the operation of the external mouse 35 is input to the port D2 and the data corresponding to the operation of the internal pointing stick 33 is input to the exclusive-use port for the internal pointing stick 33. At this time, the IPS controller 34 processes the input data from the first operated one of the external mouse 35 and internal pointing stick 33 and outputs the processed data to the port D1.

For example, if the internal pointing stick 33 is operated and data input is started, the data from the internal pointing stick 33 is preferentially output from the port D1 until the operation of the pointing stick 33 is completed, even if data is input to the port D2 by the operation of the external mouse 35. Of course, the opposite preferential operation is performed if the external mouse 35 is first operated.

If the switching control signal CS supplied to the IPS controller 34 is "0", no data is output from the port D1.

As mentioned above, the switching control signal CS input to the pointing device selector 32 and IPS controller 34 depends on the pointing device switching control bit of the universal register 26a. Specifically, if the pointing device switching control bit is "0", the switching control signal supplied to the data transfer gate 32a and IPS controller 34 is "0" and the control signal "1" is input to the data transfer gate 32b.

Accordingly, only the data transfer path of the data transfer gate 32b is closed. Thereby, communication between the external mouse 35 and CPU 11 is enabled through the pointing device selector 32 and keyboard controller 25. For example, only the coordinate data corresponding to the operation of the external mouse 35 is sent to the CPU 11 through the data transfer gate 32b of the pointing device selector 32 and the keyboard controller 25, or data, etc., is sent from the CPU 11 to the external mouse 35.

On the other hand, if the pointing device switching control bit is "1", the switching control signal of value "0" is supplied to the data transfer gate 32b and the switching control signal of value "1" is supplied to the data transfer gate 32a and IPS controller 34. Thus, the transmission path of the data transfer gate 32a is closed and the IPS controller 34 processes not only the data sent from the internal pointing stick 33 but also the data from the external mouse 35 if the mouse 35 is connected, on the basis of the preferential function, and the IPS controller 34 outputs the processed data from the port D1. Thereby, data communication between the IPS controller 34 and the CPU 11 is enabled via the data transfer gate 32a of pointing device selector 32 and keyboard controller 25.

If communication between the CPU 11 and the external mouse 35 is to be achieved, the pointing device switching control bit is set at "0". If communication between the CPU 11 and the IPS controller 34 is to be achieved, the pointing device switching control bit is set at "1".

Figure 4:
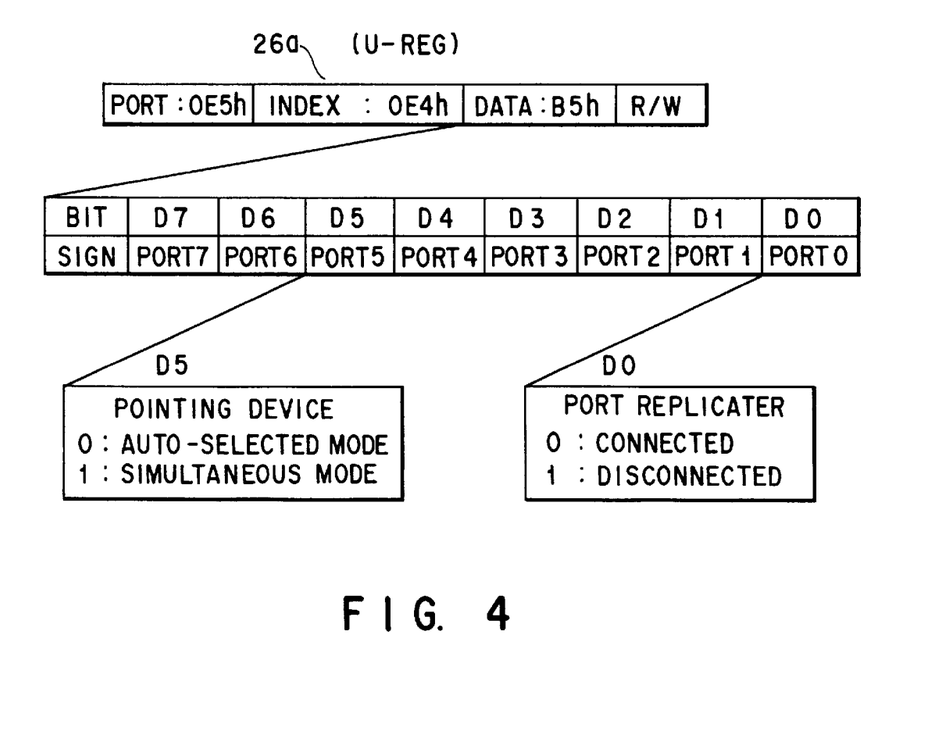
FIG. 4 shows the structure of a universal register (U-Reg) shown in FIG. 1.

An example of the structure of the universal register (U-Reg) 26a having the pointing device switching control bit among the universal register group provided in the PCMCIA controller (PCMCIA-CONT) 26 will now be described with reference to FIG. 4. In the universal register 26a, bit D5 (PORT5) is a switching control bit for controlling switching of the pointing device and the switching control bit is updated by the CPU 11. The switching control bit is set at "0" when the CPU 11 communicates with the external mouse 35, as described above, and is set at "1" when the CPU 11 communicates with the IPS controller 34.

In the universal register 26a, a bit D0(PORT0) represents the connection/disconnection state of the port replicator 29. The bit D0 is "0" if the port replicator 29 is attached to the extension connector 28, as shown in FIG. 9. The bit D0 is "1" if the port replicator 29 is not attached. A detailed description of a mechanism for detecting the connection/disconnection state of the port replicator 29 is omitted.

A set-up screen for setting set-up information of various system configurations will now be described with reference to FIG. 5. If the operator activates a set-up program stored in the system memory 12, a set-up screen (set-up menu) as shown in FIG. 5 is displayed on the display 15. The operator can confirm the set states of various systems shown on the set-up menu and can set the use environment of the various system configurations.

In particular, in this embodiment, the auto-selected mode or simultaneous mode can be selected at the item "POINTING DEVICE" in Section "OTHERS." Thereby, the input mechanism desired by the operator is achieved. Specifically, in the case where the item "POINTING DEVICE" is set in the auto-selected mode, if the external mouse 35 is connected to the extension connector 28 via the port replicator 29 at the time of activating the system, the internal pointing stick 33 cannot be used and only the external mouse 35 can be used. If the external mouse 35 is not connected, the internal built-in pointing stick 33 can be used. On the other hand, in the case where the item "POINTING DEVICE" is set in the simultaneous mode, if the external mouse 35 is connected to the extension connector 28 via the port replicator 29 at the time of activating the system, both the internal pointing stick 33 and external mouse 35 can be used under the control of the IPS controller 34.

The various set information items on the set-up menu are held in the static RAM of the real time memory 20 and are kept even when the computer system is turned off.

Figure 8:
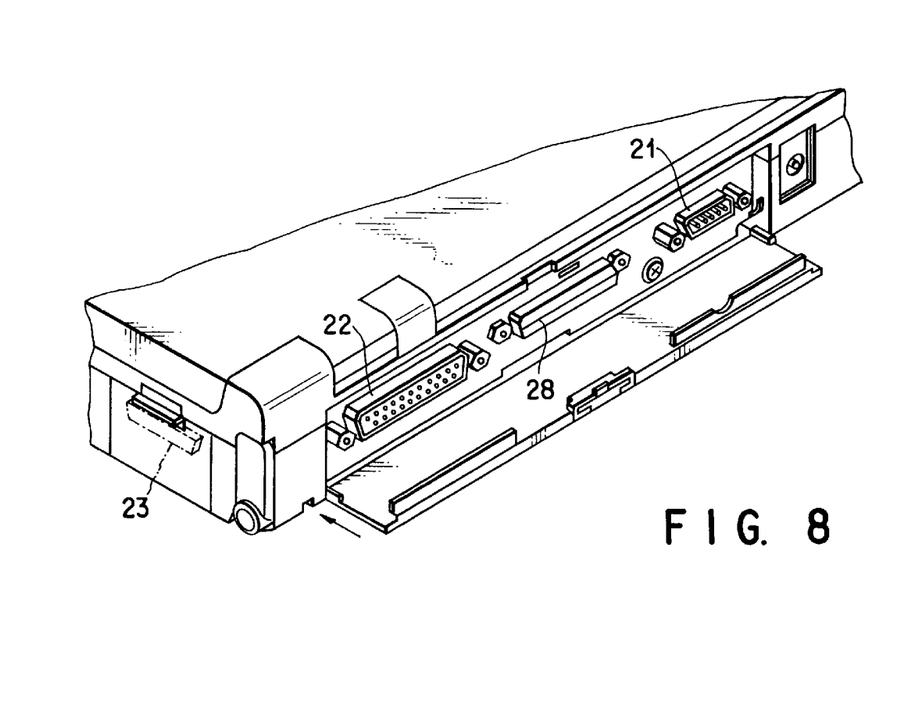
FIG. 8 is a perspective view showing an example of arrangement of external device connection ports provided on the rear face of a computer body of the computer system of this embodiment.

The external appearance of the computer system of this embodiment will now be described with reference to FIGS. 8 to 10. FIG. 8 shows an example of an arrangement of external device connection ports provided on the rear face of the computer system body. Each connection port is protected by a cover provided on the system body when it is not used. In this embodiment, an extension floppy disk drive connector 23 is provided on a side face of the system body. FIG. 9 shows the computer system body with the port replicator 29 connected to the extension connector 28 of FIG. 1 (not visible in FIG. 9). In this example, the port replicator 29 allows additional provision of an extension port Pa for connection with the external mouse 35, an extension port Pb for connection with the external keyboard 30, and an extension port Pc (RGB) for connection with an external color monitor (CRT monitor).

FIG. 10 shows an example of specific arrangement of the operating stick 33a and control buttons 33b of the internal pointing stick 33 provided in the standard built-in internal keyboard 27. In this example, the operating stick 33a is projected between the home position keys ("F" key and "J" key) on the keyboard.

A BIOS processing operation for the pointing device, which is effected in the initializing process (IRT process) at the time of turning on the system in this embodiment, will now be described with reference to FIGS. 6, 7A, 7B and 7C. The BIOS process illustrated in the flow chart of FIG. 6 is designed to effect initialization of the IPS controller 34, detection of connection/disconnection of the external mouse 35, and setting of the input mechanism according to the mode designated on the set-up menu.

Figures 7A, 7B:
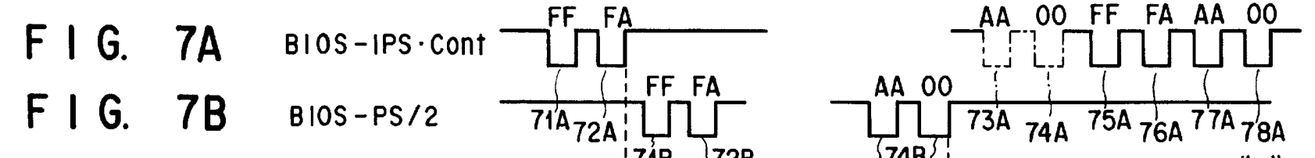
FIG. 7A illustrates a transmission/reception timing of commands and data between an IPS-controller and a CPU executing a BIOS.
FIG. 7B illustrates a transmission/reception timing of commands and data between an external mouse and the CPU.
Figure 7C:
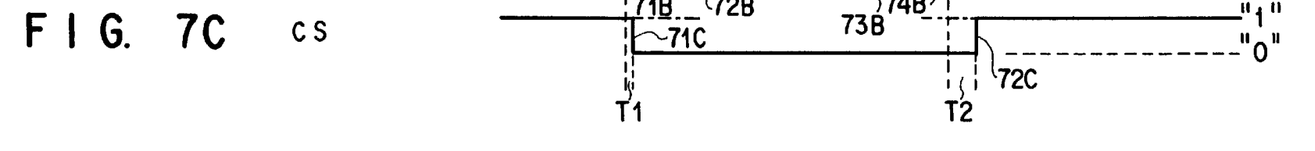
FIG. 7C shows the internal state of the pointing device selector.

FIG. 7A illustrates the transmission timing of commands and data between the CPU 11, which executes the BIOS process, and the IPS controller 34. FIG. 7B illustrates the transmission timing of commands and data between the CPU 11, which executes the BIOS process, and the external mouse 35. FIG. 7C illustrates the level of the switching control signal (CS) supplied to the pointing device selector 32 and IPS controller 34.

In FIGS. 7A and 7B, numerals 71A, 71B and 75A (FF) denote initialization commands, and 72A, 72B and 76A (FA) denote responses (ACK). Numeral 71C indicates a time point for switching from the simultaneous mode to auto-selected mode of the pointing device selector 32, and numeral 72C indicates a time point for switching from the auto-selected mode to simultaneous mode of the pointing device selector 32.

Numerals 73A, 73B, 77A (AA), 74A, 74B, 78A (00) denotes data for phase matching (indicating completion of the initialization process). Numerals T1 and T2 indicate wait time periods for enabling the IPS controller 34 to constantly recognize the exact level of the switching control level CS.

The IPS controller 34 issues the ACK 72A in response to the initialization command 71A and, after time period T1 (between 71C and 72C), recognizes the switching state of the pointing device selector 32 with reference to the pointing device switching control bit in the universal register 26a. The data 73A (AA) and data 74A (00) are not output when the switching control bit is "0" at the time of checking.

When the system power is turned on, the flash memory or BIOS-ROM 17 is checked and the programs stored in the BIOS-ROM 17 is copied in the system memory 12. Thereafter, the initialization process is executed, as illustrated in FIG. 6. Part of the initialization process is executed upon power-on of the system, even if the power-up mode is set to the resume mode on the set-up menu shown in FIG. 5.

In order to initialize the internal pointing stick 33, the CPU 11 sets "0" at the bit 12x of the system configuration table (SCT) of the system memory 12 (step S1). The bit 12x represents connection/disconnection of the external mouse 35. The value "0" of the bit 12x represents the disconnected state of the external mouse 35, and the value "1" thereof represents the connected state of the external mouse 35. The CPU 11 further sets "1" at the pointing device switching control bit (bit D5) of the universal register 26a provided in the PCMCIA controller 26 (step S2).

If the above bit setting is completed, the CPU 11 outputs the initialization command 71A (FF) to the IPS controller 34 (step S3). If the ACK 72A is sent from the IPS controller 43 in response to the initialization command ("YES" in step S4), the CPU 11 changes the switching control bit D5 from "1" to "0" in order to initialize the external mouse 35 and the IPS controller 34 successively, and issues the initialization command once again (steps S5 and S6).

On the other hand, if the IPS controller 34 sends the ACK 72A (FA) to the CPU 11 in response to the initialization command 71A, the IPS controller 34 waits for the time period T1 and checks the switching control bit D5 of the universal register 26a between the time points 71C and 72C in FIG. 7C. If the switching control bit D5 is "0", i.e. if the switching control signal CS is "0", the IPS controller 34 determines that the initialization process command 71A (FF) sent from the CPU 11 in step S3 is the switching command for initializing the external mouse 35. If the switching control signal CS is "1", the IPS controller 34 determines that the initialization process command 71A (FF) sent from the CPU 11 in step S3 is the switching command for initializing the internal pointing stick 33.

Since the switching control bit D5 was changed from "1" to "0" in step S5, the IPS controller 34 determines that the initialization process command 71A (FF) sent from the CPU 11 in step S3 is the switching command.

Accordingly, the initialization command issued by the CPU 11 in step S6 is sent to the external mouse 35 as the initialization command 71B shown in FIG. 7B. When the external mouse 35 is connected to the I/O port Pa of the port replicator 29, the external mouse 35 sends the ACK 72B to the CPU 11. Furthermore, the external mouse 35 initializes the internal components according to the initialization command 71B and outputs to the CPU 11 the data items 73B (AA) and 74B (00) to indicate the completion of the initialization process in order to effect phase matching.

If a response to the initialization command 71B sent in step S6 is received, the CPU 11 determines that the external mouse 35 is connected to the port replicator 29 ("YES" in step S7), reads the phase-matching data items 73B and 74B sent from the external mouse 35, and sets "1" representing the presence of the mouse at the mouse presence/absence bit 12x of the SCT (steps S8, S9 and S10).

Then, the CPU 11 reads the pointing device setting information (PS) from the CMOS of the real-time clock 20 and determines whether the set mode is the "auto-selected mode" or "simultaneous mode" (step S11). If the set mode is the "auto-selected mode", the initialization process relating to the pointing device is completed.

Since the PS information is "auto-selected mode" and the external mouse 35 is connected, the CPU 11 does not need to execute the initialization process for the internal pointing stick 33 and the CPU 11 is required to instruct only the initialization process of the external mouse 35. Moreover, since the pointing device switching bit D5 is set at "0", only the coordinate data detected by the external mouse 35 is sent to the CPU 11 via the data transfer gate 32b of the pointing device selector 32. In this case, the data sent from the external mouse 35 is not subjected to the control by the IPS controller 34. Thus, the external mouse 35 is used with its own functions and performance.

If the pointing device setting information (PS) held by the real-time clock 20 is the "simultaneous mode" ("NO" in step 11), the CPU 11 enables both the internal pointing stick 33 and external mouse 35 to be used and therefore the CPU 11 needs to initialize the IPS controller 34 for controlling the internal pointing stick 33.

Accordingly, in order to allow the IPS controller 34 to have a time for checking the switching control signal CS, i.e., a time period between 71C and 72C, the CPU 11 reads the data 74B (00) from the external mouse 35 and then waits for the time period T2 (step S12). Thereafter, the CPU 11 changes the pointing device switching bit D5 from "0" to "1" and issues the initialization command 75A (FF) (steps S13 and S14).

Since the switching control bit D5 was changed to "1" in step S13, the pointing device selector 32 closes the data transfer path of the data transfer gate 32a and cuts off the data transfer path of the data transfer gate 32b. Accordingly, the data transfer path between the keyboard controller 25 and the IPS controller 34 is connected and the data transfer path between the keyboard controller 25 and the external mouse 35 is cut off. It should be noted, however, that the external mouse 35 remains connected to the I/O port D2 of the IPS controller 34.

When the IPS controller 34 receives the initialization command 75A through the pointing device selector 32, the IPS controller 34 sends the ACK 76A back to the CPU 11. After issuing the ACK 76A, the IPS controller 34 recognizes the state of the switching control bit D5. In this case, since the switching control bit D5 was set at "1" in step S13, the IPS controller 34 determines that the initialization command 75A is the initialization command for initializing the internal pointing stick 33. Thus, the IPS controller initializes the inside thereof and outputs the data items 77A (AA) and 78A (00) for phase matching.

If the CPU 11 receives the ACK 75A from the IPS controller 34 ("YES" in step S15), it further receives and reads the data 77A and 78A and completes the initialization process for the pointing device. Thus, the initialization process of the IPS controller 34 for using the internal pointing stick 33 and the initialization process for the external mouse 35 are completed.

In step S13 the switching control bit D5 was set at "1". Accordingly, the data transfer path of the data transfer gate 32a of the pointing device selector 32 is connected and the data transfer path of the data transfer gate 32b is cut off. Since the switching control bit D5 is "1", the IPS controller 34 processes, based on its preferential function, the positional coordinate data of the external mouse 35 sent from the I/O port D2 and the positional coordinate data sent from the internal pointing stick 33. The processed result is sent out to the pointing device selector 32 via the I/O port D1. In this case, the coordinate data detected by the internal pointing stick 33 and the external mouse 35 is processed under the control of the IPS controller 34. Thus, the functions and performance of the external mouse 35 are equalized to those of the internal pointing stick 33.

Where the external mouse 35 is not connected to the port replicator 29, the ACK 72B is not sent back to the CPU 11 in response to the initialization command 71B issued in step S6. If no response (ACK) is sent back from the external mouse 35 ("NO" in step S7), the CPU 11 determines that the external mouse 35 is not connected and instructs the initialization process of the IPS controller 34 for using the internal pointing stick 33, irrespective of the set mode of the pointing device setting information PS. Thereby, the initialization process of the IPS controller 34 is performed (steps S12 to S17), and the BIOS initialization process relating to the pointing device is completed. A description of the initialization process of the IPS controller 34 is omitted since this process corresponds to steps S12 to S17.

If no response (ACK) is issued after the CPU 11 sends the initialization command to the IPS controller 34 ("NO" in step S4; "NO" in step S15), the CPU 11 determines that some abnormality has occurred in the internal pointing stick 33 and executes a predetermined error process (step S18). After the error process is executed, the CPU 11 completes the BIOS initialization process relating to the pointing device.

Since the computer system of this invention has the above-described initializing function for the pointing device, the connected external mouse 35 can be used with its own functions and performance. The functions and performance of the built-in pointing device and optional pointing device can be fully exhibited, and the input mechanism with high operability can be realized.

Moreover, the pointing device input mechanism having optionally the "auto-selected mode" and "simultaneous mode" can be achieved. In the "auto-selected mode" either the internal pointing stick 33 or external mouse 35 can be used, and in the "simultaneous mode" both the internal pointing stick 33 and external mouse 35 can be used. In the "auto-selected mode", if the external mouse 35 is connected, the use of the internal pointing stick 33 is disabled and the external mouse 35 can be used with its own functions and performance, and if the external mouse 35 is not connected, the internal pointing stick 33 can be used. Accordingly, the operator can effectively use the external mouse 35 with its own functions and performance. On the other hand, in the "simultaneous mode", if the external mouse 35 is connected, both the external mouse 35 and internal pointing stick 33 can be used, and if the external mouse 35 is not connected, the internal pointing stick 33 can be used. Accordingly, the operator can effectively use both the external mouse 35 and the internal pointing stick 33. By selecting one of the two modes, the standard built-in pointing device and the optionally connected pointing device can effectively be used.

As described above, part of the initialization process, including the process illustrated in the flow chart of FIG. 6, is executed even if the resume function is set to resume the state immediately prior to the power-off upon the power-on. Thus, in order to achieve the input mechanism based on each mode, it is not necessarily required to perform boot processing in the power-on procedure.

In the preferred embodiment, the external mouse 35 is connected to the system body through the port replicator 29. However, the system body may be provided with a port for the external mouse 35 and the external mouse 35 may be connected to this port.

In the preferred embodiment, when the "auto-selected mode" is set, the external mouse 35 can be used with its own functions and performance. However, without providing such mode setting means, the input mechanism may be designed to be set up in the "auto-selected mode" when the external mouse 35 is connected to the port replicator 29 on the basis of recognition that the user wishes to use the external mouse 35 with its own functions and performance.

Further, in the preferred embodiment, the switching of the data transfer path of the pointing device selector 32 is effected on the basis of the switching control bit D5 of the universal register 26a. For example, the connection of the external mouse 35 to the port replicator 29 may be detected by a switch, etc., and the pointing device selector 32 may be controlled by a signal representing the detected result. However, the switching state of the pointing device selector 32 must be applied to the CPU 11 and IPS controller 34.

In the preferred embodiment, the pointing stick is used as a standard built-in pointing device, and the mouse is used as an optionally connected pointing device. However, in other embodiments of the invention the standard built-in pointing device may be a track ball, etc., and the optionally connected pointing device may be another type of pointing device such as a joy stick.

The structure of the pointing device selector 32 is not limited to that shown in FIG. 3 and may be other circuit structure capable of effecting switch control according to the operation of the preferred embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer to which an external pointing device can be selectively connected, comprising:

an internal pointing device;

means for detecting whether the external pointing device is electrically connected to the computer, wherein the external pointing device is a computer mouse;

means for storing one of a first mode data indicating both the internal pointing device and the external pointing device are enabled and a second mode data indicating that the internal pointing device is disabled and the external pointing device is enabled when the external pointing device is detected or that the internal pointing device is enabled when the external pointing device is not detected;

a pointing device controller, electrically coupled to the internal pointing device, including a first port which is electrically coupled to the external pointing device when the external pointing device is connected to the computer and a second port; the controller being enabled when the first mode data is set in the storing means, or when the second mode data is set in the storing means and the detecting means detects the external pointing device is not connected to the computer;

the first port inputting data from the external pointing device, the second port outputting data from the external pointing device or the internal pointing device when the controller is enabled;

a selector having a first terminal electrically coupled to the first port, a second terminal electrically coupled to the second port, and a third terminal; the first terminal being electrically connected to the third terminal when the second mode data is set in the storing means and the detecting means detects the external pointing device is connected to the computer; the second terminal being electrically connected to the third terminal when the first mode data is set in the storing means, or when the second mode data is set in the storing means and the detecting means detects the external pointing device is not connected to the computer; and a keyboard controller electrically coupled to the third terminal and inputting data from the external pointing device through the first and the third terminals of the selector when the second mode data is set in the storing means and the detecting means detects the external pointing device is connected to the computer; the keyboard controller inputting data from the pointing device controller through the second and the third terminals of the selector when the first mode data is set in the storing means, or when the second mode data is set in the storing means and the detecting means detects the external device is not connected to the computer.

2. A computer according to claim 1, wherein the pointing device controller, when the first mode data is set in the storing means and the detecting means detects the external pointing device is connected to the computer, outputs data selectively from one of the external pointing device and the internal pointing device through the second port in accordance with starting of operation of one of the external pointing device and the internal pointing device.

3. A computer to which an external pointing device can be selectively connected, comprising:

an internal pointing device;

means for storing one of a first mode data indicating both the internal pointing device and the external pointing device are enabled and a second mode data indicating that the internal pointing device is disabled and the external pointing device is enabled when the external pointing device is connected to the computer or that the internal pointing device is enabled when the external pointing device is not connected to the computer, wherein the external pointing device is a computer mouse;

a pointing device controller electrically coupled to the internal pointing device, including first and second ports; the external pointing device electrically coupled to the first port when the external pointing device is connected to the computer; the controller being enabled when the first mode data is set in the storing means, or when the second mode data is set in the storing means and the external pointing device is not connected to the computer; the first port inputting data from the external pointing device, the second port outputting data from one of the external pointing device and the internal pointing device when the controller is enabled;

a keyboard controller; and a selector having a first terminal electrically coupled to the first port, a second terminal electrically coupled to the second port and a third terminal electrically coupled to the keyboard controller; the first terminal being electrically connected to the third terminal to transmit the data from the external pointing device directly to the keyboard controller when the second mode data is set in the storing means and the external pointing device is connected to the computer; the second terminal being electrically connected to the third terminal to transmit the data from the pointing device controller to the keyboard controller when the first mode data is set in the storing means, or when the second mode data is set in the storing means and the external pointing device is not connected to the computer.

4. A computer according to claim 3, wherein the pointing device controller, when the first mode data is set in the storing means and the detecting means detects the external pointing device is connected to the computer, outputs data selectively from one of the external pointing device and the internal pointing device through the second port in accordance with starting of operation of one of the external pointing device and the internal pointing device.

5. A computer to which an external pointing device can be selectively connected, comprising:

an internal pointing device;

means for storing one of a first mode data for enabling both the internal pointing device and the external pointing device and a second mode data for either disabling the internal pointing device and enabling the external pointing device when the external pointing device is connected to the computer or enabling the internal pointing device when the external pointing device is not connected to the computer, wherein the external pointing device is a computer mouse;

a pointing device controller electrically coupled to the internal pointing device, including first and second ports, the external pointing device electrically coupled to the first port when the external pointing device is connected to the computer; the controller being enabled when the first mode data is set in the storing means, or when the second mode data is set in the storing means and the external pointing device is not connected to the computer; data from the external pointing device being output from the second port through the first port when the first mode data is set in the storing means, and data from the internal pointing device being outputted from the second port;

a keyboard controller; and means for electrically connecting the second port and the keyboard controller when the first mode data is set in the storing means, or when the second mode is set in the storing means and the external pointing device is not connected to the computer, to transmit the data from the pointing device controller to the keyboard controller, and for directly connecting the external pointing device and the keyboard controller when the second mode data is set in the storing means and the external pointing device is connected to the computer to transmit the data from the external pointing device directly to the keyboard controller.

6. A computer according to claim 5, wherein the pointing device controller, when the first mode data is set in the storing means and the detecting means detects the external pointing device is connected to the computer, outputs data selectively from one of the external pointing device and the internal pointing device through the second port in accordance with starting of operation of one of the external pointing device and the internal pointing device.

7. A computer to which an external pointing device can be selectively connected, comprising:

an internal pointing device;

means for storing one of a first mode data for enabling both the internal pointing device and the external pointing device and a second mode data for enabling the internal pointing device when the external pointing device is not connected or disabling the internal pointing device and enabling the external pointing device when the external pointing device is connected, wherein the external pointing device is a mouse;

a keyboard controller;

means for controlling the internal pointing device and the external pointing device when the first mode data is set in the storing means; the controlling means being enabled when the first mode data is set in the storing means, or when the second mode data is set in the storing means and the external pointing device is not connected to the computer; the controlling means having a first port inputting data from the external pointing device and a second port outputting data from the internal pointing device or the data input through the first port from the external pointing device; and means for electrically connecting the second port and the keyboard controller when the first mode data is set in the storing means, or, when the second mode is set in the storing means and the external pointing device is not connected to the computer, to transmit the data from the pointing device controller to the keyboard controller, and directly connecting the external pointing device and the keyboard controller when the second mode data is set in the storing means and the external pointing device is connected to the computer to transmit the data from the external pointing device directly to the keyboard controller.

8. A computer according to claim 7, wherein the pointing device controller, when the first mode data is set in the storing means and the detecting means detects the external pointing device is connected to the computer, outputs data selectively from one of the external pointing device and the internal pointing device through the second port in accordance with starting of operation of one of the external pointing device and the internal pointing device.

* * * * *